US012729253B2

(12) United States Patent
Kim et al.

(10) Patent No.: US 12,729,253 B2
(45) Date of Patent: Sep. 8, 2026

(54) CURABLE COMPOSITION

(71) Applicant: LG Energy Solution, Ltd., Seoul (KR)

(72) Inventors: Do Yeon Kim, Daejeon (KR); Young Jo Yang, Daejeon (KR); Yang Gu Kang, Daejeon (KR); Jeong Hyun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 746 days.

(21) Appl. No.: 18/012,026

(22) PCT Filed: Aug. 19, 2021

(86) PCT No.: PCT/KR2021/011022
§ 371 (c)(1),
(2) Date: Dec. 21, 2022

(87) PCT Pub. No.: WO2022/071661
PCT Pub. Date: Apr. 7, 2022

(65) Prior Publication Data

US 2023/0257493 A1 Aug. 17, 2023

(30) Foreign Application Priority Data

Sep. 29, 2020 (KR) ........................ 10-2020-0127535

(51) Int. Cl.

| | |
|---|---|
| ***C08F 36/06*** | (2006.01) |
| ***C08F 222/06*** | (2006.01) |
| ***C08K 3/22*** | (2006.01) |
| ***C08K 3/32*** | (2006.01) |
| ***C08K 5/37*** | (2006.01) |
| ***C08L 71/02*** | (2006.01) |

(52) U.S. Cl.
CPC ............ *C08F 36/06* (2013.01); *C08F 222/06* (2013.01); *C08K 3/22* (2013.01); *C08K 3/32* (2013.01); *C08K 5/37* (2013.01); *C08L 71/02* (2013.01); *C08K 2003/2227* (2013.01); *C08K 2003/329* (2013.01); *C08K 2201/001* (2013.01)

(58) Field of Classification Search
CPC ...................................................... C08F 36/06
See application file for complete search history.

(56) References Cited

U.S. PATENT DOCUMENTS 3,876,723 A * 4/1975 Strecker .................. C08K 5/14 528/109
5,130,463 A 7/1992 Haubennestel et al.
5,728,746 A * 3/1998 Sicken .................. C08J 9/0038 558/114
6,238,596 B1 5/2001 Nguyen et al.
2018/0291156 A1* 10/2018 Tebbe ................ C08G 18/1833
2019/0375951 A1 12/2019 Knappke-Bongartz et al.
2023/0340256 A1 10/2023 Yang et al.

FOREIGN PATENT DOCUMENTS

| | | | |
|---|---|---|---|
| EP | 4206271 | A1 | 7/2023 |
| JP | 2003509574 | A | 3/2003 |
| JP | 2009013237 | A | 1/2009 |
| JP | 2011074340 | A | 4/2011 |
| JP | 2011127078 | A | 6/2011 |
| JP | 5218364 | B2 | 6/2013 |
| JP | 2015078296 | A | 4/2015 |
| JP | 2016098312 | A | 5/2016 |
| JP | 2019081860 | A | 5/2019 |
| KR | 20200012437 | A | 2/2020 |
| WO | 2010005860 | A2 | 1/2010 |

OTHER PUBLICATIONS

Disperbyk-118 Data Sheet, Issue Aug. 2021.*
Polyvest MA75 Product Information, Jan. 26, 2021.*
Extended European Search Report for Application No. 21875936.3 dated Oct. 18, 2023, pp. 1-6.
International Search Report for Application No. PCT/KR2021/011022 mailed Dec. 14, 2021, 4 pages.

* cited by examiner

*Primary Examiner* — Mark Eashoo
(74) *Attorney, Agent, or Firm* — Lerner David LLP

(57) ABSTRACT

The present application provides a curable composition having appropriate viscosities and thixotropy before and after curing even if an excessive amount of filler is included and without any sedimentation phenomenon of particles even in long-term storage, wherein the curable composition comprises a polyolefin binder having an acid anhydride unit, a filler and a dispersant, and the dispersant comprise a polymer compound containing a unit of Formula 1 below:

[Formula 1]

wherein $L_1$, $L_2$, p and q are described herein.

18 Claims, 1 Drawing Sheet

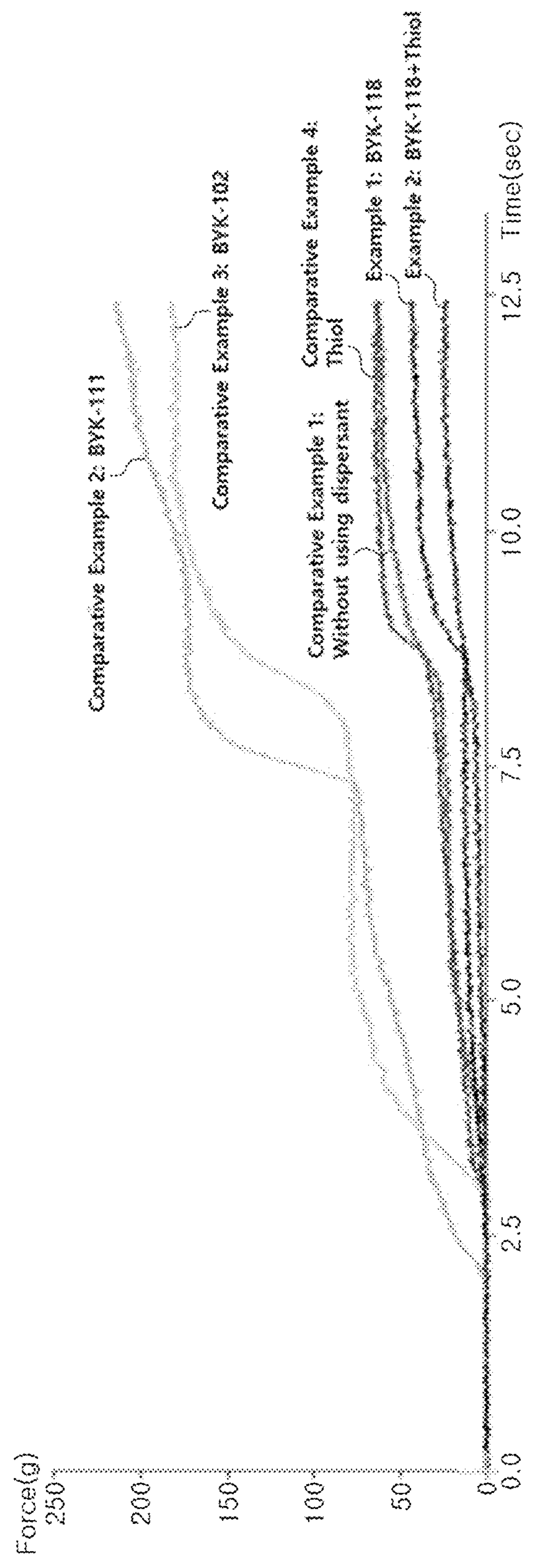
Force(g)
250
200
150
100
50
0
0.0
2.5
5.0
7.5
10.0
12.5
Time(sec)
Comparative Example 2: BYK-111
Comparative Example 3: BYK-102
Comparative Example 1: Without using dispersant
Comparative Example 4: Thiol
Example 1: BYK-118
Example 2: BYK-118+Thiol

CURABLE COMPOSITION

CROSS-REFERENCE TO RELATED APPLICATIONS

The present application is a national stage entry under 35 U.S.C. § 371 of International Application No. PCT/KR2021/011022 filed on Aug. 19, 2021, which claims priority from Korean Patent Application No. 10-2020-0127535 filed on Sep. 29, 2020, all the disclosures of which are incorporated herein by reference.

TECHNICAL FIELD

The present application relates to a curable composition.

BACKGROUND ART

As the treatment of heat generated from electric products, electronic products or batteries such as secondary batteries, becomes an important issue, various heat dissipation countermeasures have been proposed.

Among the thermally conductive materials used for heat dissipation countermeasures, resin compositions in which thermally conductive fillers are blended with resins are known.

In particular, the curable composition may comprise an excessive amount of filler in order to secure heat dissipation (thermal conductivity) or in order to secure thixotropy according to process needs.

When an excessive amount of filler is added to a resin and blended, there is a problem that the filler settles due to poor dispersion and decrease of a thixotropic index (T.I.). For this reason, it was intended to improve dispersibility by using a dispersant even when an excessive amount of filler was blended, but there is a problem that compatibility is lowered depending on the type of resin or the dispersant reacted with the resin. Therefore, it is important to use a dispersant having excellent compatibility and unreactive characteristics depending on the type of resin.

Patent Document 1 (Japanese Patent Publication No. 5218364) relates to a thermally conductive composition that maintains stable syringe discharge properties at room temperature, where a dispersant is used to improve the dispersibility of the resin and the filler, but the dispersant is not selected in consideration of excellent compatibility and unreactive characteristics.

In addition, even if the dispersant has excellent compatibility and unreactive characteristics with respect to a specific resin when mixed, there is a problem that the filler settles during long-term storage.

Specifically, in the case where a polymer containing a maleic anhydride unit and a filler are mixed, when an amine-based dispersant is applied, there is a problem that the polymer reacts with the amine-based dispersant to be cured. Therefore, when the amine-based dispersant is used, the compatibility is lowered and the compounding itself is impossible, so that a cured product can not be formed.

In addition, when a filler is mixed with a polymer containing a maleic anhydride unit, a phosphoric acid-based copolymer dispersant can be applied, but in the case where the dispersant structure does not have a propylene glycol methyl ether structure therein, there is a problem that the particles settle when the curable composition is left for a long period of time.

DISCLOSURE

Technical Problem

The present application is intended to provide a curable composition capable of solving the above-described problems.

The present application is intended to provide a curable composition having appropriate viscosities and thixotropy before and after curing even if an excessive amount of filler is included.

The present application is intended to provide a curable composition without any sedimentation phenomenon of particles even in long-term storage.

Technical Solution

In one example according to the present application, the present application relates to a curable composition having appropriate viscosity and thixotropy before and after curing, and having no sedimentation phenomenon of particles even in long-term storage. Here, the curable composition may comprise a polyolefin binder having an acid anhydride unit, a filler and a dispersant. It is also meant that the particles are capable of settling in the curable composition.

The curable composition according to the present application may comprise a dispersant, where the dispersant may be a polymer compound containing a unit of Formula 1 below.

[Formula 1]

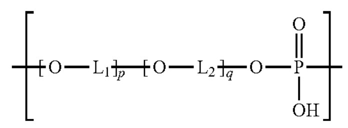

In Formula 1 above, $L_1$ may be an alkylene group having 3 to 8 carbon atoms, $L_2$ may be a methylene group or an ethylene group, and p/q may be a number within a range of 0.1 to 10.

In Formula 1 above, $L_1$ is preferably an alkylene group having 3 to 6 carbon atoms, an alkylene group having 3 to 5 carbon atoms or an alkylene group having 3 to 4 carbon atoms, where the alkylene group is more preferably a branched alkylene group.

The polymer compound containing the unit of Formula 1 above may be, for example, a unit formed by copolymerizing polypropylene glycol, polyethylene glycol and phosphoric acid. That is, the polymer compound containing the unit of Formula 1 above may be formed through copolymerization.

In another example, p/q may be a number in the range of 0.5 to 2, a number in the range of 0.75 to 1.25, or a number in the range of 0.8 to 1.2. p and q may be selected as appropriate numbers through the number average molecular weight (Me), weight average molecular weight ($M_w$) and polydispersity index (PDI) of the polymer compound containing the unit of Formula 1 above, which are described below, while satisfying the above range. When the value of p/q satisfies the above range, it is possible to secure appropriate thixotropy even after the polyolefin binder having an acid anhydride unit and the filler are mixed.

The curable composition according to the present application can prevent a sedimentation phenomenon of particles even in long-term storage by using the polymer compound containing the unit of Formula 1 above as a dispersant.

The polymer compound containing the unit of Formula 1 above may have a weight average molecular weight of 5,000 g/mol or more, 6,000 g/mol or more, 7,000 g/mol or more, 8,000 g/mol or more, 9,000 g/mol or more, 10,000 g/mol or more, 11,000 g/mol or more, 12,000 g/mol or more, 13,000 g/mol or more, 14,000 g/mol or more, 15,000 g/mol or more, or 16,000 g/mol or more, and in another example, the polymer compound containing the unit of Formula 1 above may have a weight average molecular weight of 40,000 g/mol or less, 35,000 g/mol or less, 30,000 g/mol or less, 25,000 g/mol or less, 20,000 g/mol or less, or 18,000 g/mol or less. The weight average molecular weight may be measured using GPC (gel permeation chromatography).

Also, the polymer compound containing the unit of Formula 1 may have a number average molecular weight of 4,000 g/mol or more, 5,000 g/mol or more, 6,000 g/mol or more, 7,000 g/mol or more, 8,000 g/mol or more, 9,000 g/mol or more, 10,000 g/mol or more, 11,000 g/mol or more, or 12,000 g/mol or more, and in another example, the polymer compound containing the unit of Formula 1 above may have a number average molecular weight of 35,000 g/mol or less, 30,000 g/mol or less, 25,000 g/mol or less, 20,000 g/mol or less, or 15,000 g/mol or less. The number average molecular weight may also be measured using GPC.

In addition, the polymer compound containing the unit of Formula 1 may have a polydispersity index (PDI) in the range of 0.8 to 2, preferably, in the range of 1 to 1.5.

When the weight average molecular weight, number average molecular weight and polydispersity index of the polymer compound containing the unit of Formula 1 satisfy the above ranges, the polyolefin binder having an acid anhydride unit and the filler have excellent processability even after they are mixed, whereby they are easy to handle, as well as it is possible to secure their long-term storage stability.

The content of the dispersant may be 0.05 wt % or more, 0.1 wt % or more, 0.15 wt % or more, 0.2 wt % or more, or 0.25 wt % or more, relative to the total weight of the curable composition. In another example, the content of the dispersant may be 1 wt % or less, 0.75 wt % or less, 0.5 wt % or less, 0.4 wt % or less, or 0.3 wt % or less, relative to the total weight of the curable composition. When the content of the dispersant satisfies the above range, it is possible to secure compatibility as well as long-term storage stability.

In another example, the content of the dispersant may be 1 part by weight or more, 2 parts by weight or more, 3 parts by weight or more, or 4 parts by weight or more, and may be 10 parts by weight or less, 9 parts by weight or less, 8 parts by weight or less, or 6 parts by weight or less, relative to 100 parts by weight of the polyolefin binder to be described below. When the content of the dispersant satisfies the above range, it is possible to secure compatibility as well as long-term storage stability.

The polymer compound containing the unit of Formula 1 may be included in an amount of 50 wt % or more, 55 wt % or more, 60 wt % or more, 65 wt % or more, 70 wt % or more, 75 wt % or more, or 80 wt % or more, relative to the total weight of the dispersant.

The dispersant of the curable composition according to the present application may further comprise an ester compound in order to secure better dispersibility.

The ester compound may be one selected from the group consisting of, for example, alkylene glycol monoalkyl ether acetates, alkylalkoxy propionates, alkylene glycol monoalkyl ether propionates, alkylene glycol diacetates, alkyl lactates and alkyl 2-hydroxyisoalkylates. The ester compound is preferably alkylene glycol monoalkyl ether acetates.

The term alkyl group or alkylene group as used herein may be a linear or branched acyclic alkyl group or alkylene group having 1 to 20 carbon atoms, or 1 to 16 carbon atoms, or 1 to 12 carbon atoms, or 1 to 8 carbon atoms, 1 to 6 carbon atoms, or 1 to 4 carbon atoms, or may be a cyclic alkyl group or alkylene group having 3 to 20 carbon atoms, or 3 to 16 carbon atoms, or 3 to 12 carbon atoms, or 3 to 8 carbon atoms, or 3 to 6 carbon atoms, or may be a saturated hydrocarbon group to which they are bound, unless otherwise described.

The alkylene glycol monoalkyl ether acetates include, for example, methylene glycol monomethyl ether acetate, methylene glycol monoethyl ether acetate, ethylene glycol monomethyl ether acetate and ethylene glycol monoethyl ether acetate, and the like.

The alkylalkoxy propionates include, for example, methylmethoxy propionate, methylethoxy propionate, ethylmethoxy propionate and ethylethoxy propionate, and the like.

The alkylene glycol monoalkyl ether propionates include, for example, methylene glycol monomethyl ether propionate, ethylene glycol monomethyl ether propionate, methylene glycol monoethyl ether propionate and ethylene glycol monoethyl ether propionate, and the like.

The alkylene glycol diacetates include, for example, methylene glycol diacetate and ethylene glycol diacetate, and the like.

The alkyl lactates include, for example, methyl lactate, ethyl lactate and butyl lactate, and the like.

The alkyl 2-hydroxyisoalkylates include, for example, methyl 2-hydroxyisomethylate, methyl 2-hydroxyisoethylate, ethyl 2-hydroxyisomethylate and butyl 2-hydroxyisobutyrate, and the like.

The content of the ester compound may be 5 wt % or more, 7.5 wt % or more, 10 wt % or more, 12.5 wt % or more, 15 wt % or more, 17.5 wt % or more, or 20 wt % or more, relative to the total weight of the dispersant. In another example, the content of the ester compound may be 40 wt % or less, 38 wt % or less, 36 wt % or less, 34 wt % or less, 32 wt % or less, 30 wt % or less, 28 wt % or less, 26 wt % or less, 24 wt % or less, 22 wt % or less, or 20 wt % or less, relative to the total weight of the dispersant.

Other types of dispersants can also be further included and used in addition to the polymer compound containing the unit of Formula 1 and the ester compound, as long as the dispersant can secure long-term storage stability without reacting with the polyolefin binder having an acid anhydride unit.

The curable composition according to the present application may comprise a polyolefin binder having an acid anhydride unit. The acid anhydride unit may be a maleic anhydride unit or a phthalic anhydride unit, where it is preferably a maleic anhydride unit. Also, the acid anhydride unit may be bonded to the main chain of the polyolefin binder, and may be bonded to a substituent or branched chain of the polyolefin binder.

The polyolefin binder may have an acid value of 50 mg KOH/g or more, 55 mg KOH/g or more, 60 mg KOH/g or more, 65 mg KOH/g or more, or 70 mg KOH/g or more, and in another example, the polyolefin binder may have an acid value of 120 mg KOH/g or less, 110 mg KOH/g or less, 100 mg KOH/g or less, or 90 mg KOH/g or less. The acid value of the polyolefin binder may be a value measured according to DIN EN ISO 2114 standard. Through the acid value, the amount of the acid anhydride unit contained in the polyolefin binder can be known.

The polyolefin binder may contain one or more units selected from the group consisting of a styrenic unit, a butadiene unit and an isoprene unit. It is preferable that the polyolefin binder includes a butadiene unit.

The polyolefin binder may have a weight average molecular weight of 3,000 g/mol or more, 4,000 g/mol or more, 5,000 g/mol or more, 6,000 g/mol or more, 7,000 g/mol or more, 8,000 g/mol or more, 9,000 g/mol or more, or 10,000 g/mol or more, and in another example, the polymer compound containing the unit of Formula 1 above may have a weight average molecular weight of 30,000 g/mol or less, 25,000 g/mol or less, 20,000 g/mol or less, or 15,000 g/mol or less. The weight average molecular weight may be measured using GPC (gel permeation chromatography).

Also, the polyolefin binder may have a number average molecular weight of 500 g/mol or more, 1,000 g/mol or more, 1,500 g/mol or more, 2,000 g/mol or more, 2,500 g/mol or more, or 3,000 g/mol or more, and in another example, the polyolefin binder may have a number average molecular weight of 6,000 g/mol or less, 5,500 g/mol or less, 5,000 g/mol or less, 4,500 g/mol or less, 4,000 g/mol or less, or 3,500 g/mol or less. The number average molecular weight may also be measured using GPC.

In addition, the polyolefin binder may have a polydispersity index (PDI) in the range of 2 to 5, preferably, in the range of 2.75 to 3.75.

When the weight average molecular weight, number average molecular weight and polydispersity index of the polyolefin binder satisfy the above ranges, it is possible to maintain an appropriate viscosity before and after curing even if an excess of filler is included.

The content of the polyolefin binder may be 1,000 parts by weight or more, 1,200 parts by weight or more, 1,400 parts by weight or more, 1,600 parts by weight or more, 1,800 parts by weight or more, or 2,000 parts by weight or more, relative to 100 parts by weight of the dispersant. In another example, the content of the polyolefin binder may be 3,200 parts by weight or less, 3,000 parts by weight or less, 2,800 parts by weight or less, 2,600 parts by weight or less, 2,400 parts by weight or less, or 2,200 parts by weight or less, relative to 100 parts by weight of the dispersant. When the content of the polyolefin binder satisfies the above range, it is possible to ensure an appropriate viscosity and long-term storage stability even if an excessive amount of filler is mixed.

The curable composition according to the present application may be included in a one-component composition or a curing agent part of a two-component composition.

The curable composition according to the present application may be mixed with a main part to form a two-component composition. At this time, in the main part, a compound containing two or more hydroxyl groups may be included.

The curable composition according to the present application may comprise a filler in order for the cured product thereof to secure thermal conductivity. At this time, the filler may be a thermally conductive filler.

The term thermal conductivity may mean a case showing a thermal conductivity of about 1.2 W/m·K or more when measured, in a state where a curable composition is mixed with a main part to form a two-component composition, and then a disk-shaped sample (cured product) having a diameter of 2 cm or more and a thickness of 500 μm is produced with the two-component composition, according to ASTM D5470 standard or ISO 22007-2 standard along the thickness direction of the sample.

In another example, the thermal conductivity may also be 1.3 W/m·K or more, 1.4 W/m·K or more, 1.5 W/m·K or more, 1.6 W/m·K or more, 1.7 W/m·K or more, 1.8 W/m·K or more, 1.9 W/m·K or more, 2.0 W/m·K or more, 2.1 W/m·K or more, 2.2 W/m·K or more, 2.3 W/m·K or more, 2.4 W/m·K or more, 2.5 W/m·K or more, 2.6 W/m·K or more, 2.7 W/m·K or more, 2.8 W/m·K or more, 2.9 W/m·K or more, or 3.0 W/m·K or more or so. As the thermal conductivity has a higher value, it means the higher thermal conductivity, so that the upper limit thereof is not particularly limited. For example, the thermal conductivity may be 20 W/m·K or less, 18 W/m·K or less, 16 W/m·K or less, 14 W/m·K or less, 12 W/m·K or less, 10 W/m·K or less, 8 W/m·K or less, 6 W/m·K or less, or 4 W/m·K or less.

The thermal conductivity of the thermally conductive filler itself may be, for example, about 1 W/m·K or more, about 5 W/m·K or more, about 10 W/m·K or more, or about 15 W/m·K or more. In another example, the thermal conductivity of the thermally conductive filler itself may be, for example, about 400 W/m·K or less, about 350 W/m·K or less, or about 300 W/m·K or less.

The thermally conductive filler may be, for example, oxides such as aluminum oxide (alumina), magnesium oxide, beryllium oxide or titanium oxide; nitrides such as boron nitride, silicon nitride or aluminum nitride, and carbides such as silicon carbide; hydrated metals such as aluminum hydroxide or magnesium hydroxide, metal fillers such as copper, silver, iron, aluminum or nickel; metal alloy fillers such as titanium; silicon powders such as quartz, glass or silica, but is not limited thereto.

In addition, if insulating properties can be secured, application of a carbon filler such as graphite can also be considered. For example, as the carbon filler, activated carbon may be used. The form or ratio of the filler included in the cured product is not particularly limited, which may be selected in consideration of the viscosity of the curable composition, the possibility of sedimentation in the cured product, desired thermal resistance or thermal conductivity, insulation, filling effect or dispersibility, and the like.

The shape of the thermally conductive filler may be appropriately selected from a spherical shape and/or a non-spherical shape (e.g., needle shape and plate shape, etc.) as needed, and used, but is not limited thereto.

As the thermally conductive filler, one or two or more suitably selected as needed may be used. In addition, even if the same type of thermally conductive filler is used, those having different shapes may be mixed and used, or those having different average particle diameters may be mixed and used. For example, aluminum hydroxide, aluminum, and alumina may be mixed and used as a thermally conductive filler, and their shapes and average particle diameters may be different from each other.

In addition, it is advantageous to use a spherical thermally conductive filler in consideration of the amount to be filled, but in consideration of network formation or conductivity, a thermally conductive filler in a form such as a needle shape or a plate shape may also be used.

In one example, the curable composition may comprise a thermally conductive filler having an average particle diameter in a range of 0.001 μm to 80 μm. In another example, the average particle diameter of the thermally conductive filler may be 0.01 μm or more, 0.1 μm or more, 0.5 μm or more, 1 μm or more, 2 μm or more, 3 μm or more, 4 μm or more, 5 μm or more, or about 6 μm or more. In another example, the average particle diameter of the thermally conductive filler may be about 75 μm or less, about 70 μm or less, about 65 μm or less, about 60 μm or less, about 55 μm or less, about 50 μm or less, about 45 μm or less, about 40 μm or less, about 35 μm or less, about 30 μm or less, about 25 μm or less, about 20 μm or less, about 15 μm or less, about 10 μm or less, or about 5 μm or less.

At this time, the average particle diameter of the thermally conductive filler is a so-called D50 particle diameter (median particle diameter), which may mean a particle diameter at 50% cumulative by volume of the particle size distribution. That is, the particle diameter at the point where the particle size distribution is obtained on the basis of the volume and the cumulative value becomes 50% on the cumulative curve with 100% of the total volume can be regarded as the average particle diameter. Such a D50 particle diameter may be measured by a laser diffraction method.

According to the size of the thermally conductive filler, it can be divided into a large thermally conductive filler, a medium thermally conductive filler and a small thermally conductive filler. The large thermally conductive filler may have an average particle diameter of 80 μm or less, 78 μm or less, 76 μm or less, 74 μm or less, or 72 μm or less. In another example, the large thermally conductive filler may have an average particle diameter of 60 μm or more, 62 μm or more, 64 μm or more, 66 μm or more, or 68 μm or more. The medium thermally conductive filler may have an average particle diameter of 58 μm or less, 50 μm or less, 40 μm or less, or 25 μm or less. In another example, the medium thermally conductive filler may have an average particle diameter of 10 μm or more, 12.5 μm or more, 15 μm or more, or 17.5 μm or more. The small thermally conductive filler may have an average particle diameter of 9 μm or less, 5 μm or less, 3 μm or less, or 1 μm or less. In another example, the small thermally conductive filler may have an average particle diameter of 0.001 μm or more, 0.01 μm or more, 0.05 μm or more, 0.1 μm or more, 0.2 μm or more, 0.4 μm or more, 0.8 μm or more, or 1 μm or more.

As the thermally conductive filler, two or more of a large thermally conductive filler, a medium thermally conductive filler or a small thermally conductive filler may be selected and used. At this time, the thermally conductive filler may satisfy the content ratio and/or particle diameter ratio, and the like within the following range so that room temperature quick curability may be secured through an appropriate combination with the polyolefin binder having an acid anhydride unit included in the curable composition of the present application.

When the thermally conductive filler comprises a large thermally conductive filler, the content of the large thermally conductive filler may be 30 wt % or more, 37.5 wt % or more, 42.5 wt % or more, 47.5 wt % or more, 50 wt % or more, 52.5 wt % or more, 55 wt % or more, 57.5 wt % or more, 60 wt % or more, or 62 wt % or more, relative to the total weight of the thermally conductive filler. In another example, the content of the large thermally conductive filler may be 87.5 wt % or less, 80 wt % or less, 75 wt % or less, 72.5 wt % or less, 70 wt % or less, 67.5 wt % or less, or 65 wt % or less, relative to the total weight of the thermally conductive filler. In addition, it is preferable that the large thermally conductive filler is spherical particles.

When the thermally conductive filler comprises a medium thermally conductive filler, the content of the medium thermally conductive filler may be 5 wt % or more, 10 wt % or more, 12 wt % or more, 14 wt % or more, 16 wt % or more, 18 wt % or more, or 20 wt % or more, relative to the total weight of the thermally conductive filler. In another example, the content of the medium thermally conductive filler may be 52.5 wt % or less, 50 wt % or less, 45 wt % or less, 40 wt % or less, 36 wt % or less, 32 wt % or less, 28 wt % or less, 24 wt % or less, or 20 wt % or less, relative to the total weight of the thermally conductive filler. In addition, it is preferable that the medium thermally conductive filler is spherical particles.

When the thermally conductive filler comprises a small thermally conductive filler, the content of the small thermally conductive filler may be 5 wt % or more, 7.5 wt % or more, 10 wt % or more, 12.5 wt % or more, or 15 wt % or more, relative to the total weight of the thermally conductive filler. In another example, the content of the small thermally conductive filler may be 47.5 wt % or less, 40 wt % or less, 32.5 wt % or less, 25 wt % or less, 20 wt % or less, or 17.5 wt % or less, relative to the total weight of the thermally conductive filler. In addition, it is preferable that the small thermally conductive filler is non-spherical particles.

When the thermally conductive filler comprises a large thermally conductive filler and a medium thermally conductive filler, it is preferable that considering the room temperature quick curability of the curable composition according to the present application, the content of the medium thermally conductive filler is 25 parts by weight or more, 26 parts by weight or more, 27 parts by weight or more, 28 parts by weight or more, 29 parts by weight or more, or 30 parts by weight or more, relative to 100 parts by weight of the large thermally conductive filler. In another example, it is preferable that considering the room temperature quick curability of the curable composition according to the present application, the content of the medium-sized thermally conductive filler is 45 parts by weight or less, 42.5 parts by weight or less, 40 parts by weight or less, 37.5 parts by weight or less, 35 parts by weight or less, or 32.5 parts by weight or less, relative to 100 parts by weight of the large thermally conductive filler. In addition, it is preferable that the value of the average particle diameter (D1) of the large thermally conductive filler/the average particle diameter (D2) of the medium thermally conductive filler is 2 or more, 2.25 or more, 2.5 or more, 2.75 or more, 3 or more, 3.25 or more, or 3.5 or more, and it is preferable that it is 5 or less, 4.5 or less, 4.25 or less, 4 or less, 3.75 or less, or 3.5 or less. When the large and medium thermally conductive fillers satisfy the above ranges, it is possible to secure room temperature quick curability of the curable composition according to the present application.

When the thermally conductive filler comprises a large thermally conductive filler and a small thermally conductive filler, it is preferable that considering the room temperature quick curability of the curable composition according to the present application, the content of the small thermally conductive filler is 15 parts by weight or more, 17.5 parts by weight or more, 20 parts by weight or more, or 22.5 parts by weight or more, relative to 100 parts by weight of the large thermally conductive filler. In another example, it is preferable that considering the room temperature quick curability of the curable composition according to the present application, the content of the small thermally conductive filler is 40 parts by weight or less, 35 parts by weight or less, 30 parts by weight or less, or 25 parts by weight or less, relative to 100 parts by weight of the large thermal conductive filler. In addition, it is preferable that the value of the average particle diameter (D1) of the large thermal conductive filler/the average particle diameter (D3) of the small thermal conductive filler is 50 or more, 52.5 or more, 55 or more, 57.5 or more, 60 or more, 62.5 or more, 65 or more, 67.5 or more, or 70 or more, and it is preferable that it is 500 or less, 100 or less, 90 or less, 85 or less, 80 or less, 75 or less, or 70 or less. When the large and small thermally conductive fillers satisfy the above ranges, it is possible to secure room temperature quick curability of the curable composition according to the present application.

In the present application, it is most preferable to use a thermally conductive filler comprising all of a large thermally conductive filler, a medium thermally conductive filler and a small thermally conductive filler. At this time, the content ratio and the average particle diameter ratio of the respective particles are as described above, and through their appropriate combinations with the polyolefin binder having an acid anhydride unit, it is possible to secure room temperature quick curability of the curable composition according to the present application.

As the thermally conductive filler, a thermally conductive filler having Mohs hardness of 6 or more may be used. Considering the acryl monomeric component included in the curable composition according to the present application and the desired thermal conductivity, it is preferable that the content of the thermally conductive filler having Mohs hardness of 6 or more is 70 wt % or more, 75 wt % or more, or 80 wt % or more, relative to the total weight of the thermally conductive filler. In another example, it is preferable that the content of the thermally conductive filler having Mohs hardness of 6 or more is 92.5 wt % or less, 90 wt % or less, 87.5 wt % or less, or 85 wt % or less, relative to the total weight of the thermally conductive filler.

However, the thermally conductive filler having Mohs hardness of 6 or more has advantageous physical properties in terms of heat conduction, but may cause damage to equipment due to its high surface hardness. Therefore, in order to prevent such a problem, the thermally conductive filler may be used by additionally mixing a thermally conductive filler having Mohs hardness of less than 6.

However, the thermally conductive filler having Mohs hardness of less than 6 has disadvantageous physical properties compared to the thermally conductive filler having Mohs hardness of 6 or more in terms of thermal conduction, so that by lowering the hardness while achieving the desired thermal conductivity through appropriate mixing of these, it is possible to prevent the equipment damage.

In consideration of such an aspect, the content of the thermally conductive filler having Mohs hardness of less than 6 may be 5 parts by weight or more, 7.5 parts by weight or more, 10 parts by weight or more, 12.5 parts by weight or more, or 15 parts by weight or more, relative to 100 parts by weight of the thermally conductive filler having Mohs hardness of 6 or more, and in another example, it may be 30 parts by weight or less, 25 parts by weight or less, 22.5 parts by weight or less, or 20 parts by weight or less.

The thermally conductive filler having Mohs hardness of 6 or more includes, for example, aluminum oxide (alumina) and the like, which is not particularly limited. Furthermore, the thermally conductive filler having Mohs hardness of less than 6 includes, for example, aluminum hydroxide and the like, which is not particularly limited.

In addition, the thermally conductive filler having Mohs hardness of 6 or more may have Mohs hardness of 7 or more, 8 or more, or 9 or more, and the thermally conductive filler having Mohs hardness of less than 6 may have Mohs hardness of 5 or less, 4 or less, or 3 or less.

The thermally conductive filler may comprise spherical and non-spherical particles. In the present application, the term spherical particle means a particle having sphericity of about 0.95 or more, and the non-spherical particle means a particle having sphericity of less than 0.95. The sphericity can be confirmed through a particle shape analysis of the particle. Specifically, the sphericity of the filler, which is a three-dimensional particle, may be defined as a ratio (S'/S) of the surface area (S') of a sphere having the same volume as that of a particle to the surface area (S) of the particle. For real particles, circularity is generally used. The circularity is expressed as a ratio of the boundary of a circle having the same image and the same area (A) as a two-dimensional image of a real particle thus obtained to the boundary (P) of the image, which is obtained by the following equation.

$$\text{Circularity}=4\pi A/P^2 \qquad \text{<Circularity equation>}$$

The circularity is expressed as a value from 0 to 1, where a perfect circle has a value of 1, and as a particle has an irregular shape, it has a value lower than 1. The sphericity value in this specification was measured as an average value of circularity measured with Marvern's particle shape analysis equipment (FPIA-3000).

Considering the appropriate viscosity and thixotropy of the curable composition according to the present application, the content of the non-spherical particles may be 5 parts by weight or more, 7.5 parts by weight or more, 10 parts by weight or more, 12.5 parts by weight or more, or 15 parts by weight or more, relative to 100 parts by weight of the spherical particles, and in another example, it may be 30 parts by weight or less, 25 parts by weight or less, 22.5 parts by weight or less, or 20 parts by weight or less.

The content of the filler may be 25,000 parts by weight or more, 26,000 parts by weight or more, 27,000 parts by weight or more, 28,000 parts by weight or more, 29,000 parts by weight or more, 30,000 parts by weight or more, 31,000 parts by weight or more, 32,000 parts by weight or more, or 33,000 parts by weight or more, relative to 100 parts by weight of the dispersant. In another example, the content of the filler may be 45,000 parts by weight or less, 43,000 parts by weight or less, 41,000 parts by weight or less, 39,000 parts by weight or less, 37,000 parts by weight or less, 36,000 parts by weight or less, 35,000 parts by weight or less, or 34,000 parts by weight or less, relative to 100 parts by weight of the dispersant. When the content of the filler satisfies the above range, it is possible to prevent a sedimentation phenomenon of the particles even in long-term storage and with appropriate viscosity and thixotropy. In addition, it is possible to form a cured product having an excellent thermal conductivity.

Also, the curable composition according to the present application may further comprise a thiol compound in order to adjust the viscosity. The thiol compound is not particularly limited as long as it is a compound having a thiol group, but it is preferably a thiol substituted with an alkyl group. In addition, the thiol compound is more preferably a thiol substituted with an alkyl group having 2 to 16 carbon atoms, an alkyl group having 4 to 14 carbon atoms, or an alkyl group having 8 to 12 carbon atoms in consideration of operation easiness with the polyolefin binder having an acid anhydride unit.

In addition, the content of the thiol compound may be 100 parts by weight or more, 125 parts by weight or more, 150 parts by weight or more, 175 parts by weight or more, 200 parts by weight or more, 225 parts by weight or more, 250 parts by weight or more, 275 parts by weight or more, or 300 parts by weight or more, relative to 100 parts by weight of the dispersant in consideration of the combination with the dispersant comprising an ester compound. In another example, the content of the thiol compound may be 500 parts by weight or less, 475 parts by weight or less, 450 parts by weight or less, 425 parts by weight or less, 400 parts by weight or less, 375 parts by weight or less, 350 parts by weight or less, or 325 parts by weight or less, relative to 100 parts by weight of the dispersant. When the content of the thiol compound satisfies the above range, it is possible to secure better long-term storage stability.

The curable composition according to the present application may further comprise a plasticizer, if necessary. The plasticizer is an additive that reduces the viscosity or plasticity of a material, which may include phthalate series, trimellitic series, epoxy series, polyester series, and the like. The phthalate-based plasticizer includes, for example, DEHP (diethylhexyl phthalate), DINP (diisononyl phthalate), DIDP (diisodecy phthalate), and the like, and the trimellitic plasticizer includes, for example, TOTM (tris(2-ethylhexyl) trimellitate), and the like. In addition, the polyester-based plasticizer includes, for example, DINA (diisononyl adipate), and the like, and the epoxy-based plasticizer includes, for example, epoxidized soybean oil (ESBO), and the like. In addition, the plasticizer may be, in addition to those described above, an alkyl sulfonic acid ester of phenol (CAS No: 70775-94-9) and polyvinyl acetate used as an emulsion for general-purpose adhesives, and the like, but is not limited thereto.

The curable composition according to the present application may further comprise a flame retardant or a flame retardant auxiliary agent, if necessary. The curable composition further comprising a flame retardant or a flame retardant auxiliary agent may be cured to form a flame retardant resin. As the flame retardant, various known flame retardants may be applied without particular limitation, and for example, a flame retardant in the form of a solid filler or a liquid flame retardant may be applied. The flame retardant includes, for example, an organic flame retardant such as melamine cyanurate or an inorganic flame retardant such as magnesium hydroxide, but is not limited thereto. When the amount of thermally conductive filler included in the curable composition is large, a liquid type flame retardant material (TEP, triethyl phosphate or TCPP, tris(1,3-chloro-2-propyl) phosphate, etc.) may also be used. In addition, a silane coupling agent capable of acting as a flame retardant synergist may also be added.

The curable composition according to the present application may comprise the above-described constitutions, and may also be a solvent-type composition, a water-based composition, or a solventless composition.

The curable composition according to the present application may have pressing force of 60 gf or less, 59 gf or less, 58 gf or less, 57 gf or less, 56 gf or less, 55 gf or less, 54 gf or less, 53 gf or less, 52 gf or less, 51 gf or less, 50 gf or less, 49 gf or less, or 48 gf or less as defined through the following Test 1. When the pressing force is greater than 60 gf, it can be evaluated that the dispersibility of the curable composition is lowered, whereby the particles settle.

[Test 1]

1) Immediately after forming a curable composition comprising a polyolefin binder having an acid anhydride unit, a filler and a dispersant, it is put into a reactor and left at room temperature for 30 days or more.

2) A tip of a pressing force measuring device is injected into the curable composition left in 1) above up to the ⅔ point at a constant speed 3) Among the force measured in 2) above, the maximum force is defined as the pressing force.

In 1) of Test 1 above, the leaving time may be 30 days or more, 40 days or more, 50 days or more, or 60 days or more.

Here, the room temperature is a natural temperature without worming or cooling, which means a temperature within the range of about 15 to 30° C., 20 to 28° C., or 24 to 26° C.

In 1) above, the reactor may be in the form of a glass vial, where the glass vial may have a diameter of about 3 cm and a height of about 10 cm.

Also, in 2) of Test 1 above, the pressing force measuring device is not particularly limited as long as it has a detachable tip and can measure the force applied by the liquid material in contact with the tip, which can be exemplified by a physical property analyzer (Texture analyzer, TA) and the like.

The curable composition according to the present application comprises a polyolefin binder having an acid anhydride unit; a filler; and a phosphoric acid-based polymer dispersant, where the pressing force may be 60 gf or less. Here, the polyolefin binder having an acid anhydride unit and the filler are the same as described above. In addition, the phosphoric acid-based polymer dispersant may comprise a polymer compound containing the unit of Formula 1 as described above. In addition, with regard to the pressing force, the pressing force as defined through the above-described Test 1 may be 60 gf or less, 59 gf or less, 58 gf or less, 57 gf or less, 56 gf or less, 55 gf or less, 54 gf or less, 53 gf or less, 52 gf or less, 51 gf or less, 50 gf or less, 49 gf or less, or 48 gf or less.

The curable composition may be cured according to the above method to form a cured product, and may have at least one or more of the following physical properties. Each of the physical properties described below is independent, where any one physical property does not take precedence over the other properties, and the cured product of the curable composition may satisfy at least one or two or more of the physical properties described below. The cured product of the curable composition that satisfies at least one or two or more of the physical properties described below is caused by a combination of the respective components in the curable composition.

In addition, the curable composition may be included in the curing agent part of the two-component composition. That is, the curable composition according to the present application may be mixed with the main part to form a two-component composition. At this time, in the main part, a compound containing two or more hydroxyl groups may be included. The physical properties as described below may each be for a cured product in which the two-component composition is cured.

The cured product may have a thermal resistance of about 5 K/W or less, about 4.5 K/W or less, about 4 K/W or less, about 3.5 K/W or less, about 3 K/W or less, or about 2.8 K/W or less. When it is adjusted so that the heat resistance in this range can appear, excellent cooling efficiency or heat dissipation efficiency can be secured. The heat resistance may be a numerical value measured according to ASTM D5470 standard or ISO 22007-2 standard, and the measuring method is not particularly limited.

In addition, the adhesive force may be an adhesive force to any substrate or module case with which the cured product is in contact. If such an adhesive force can be secured, the appropriate adhesive force can appear to various materials, for example, a case or battery cell included in a battery module, and the like. In addition, if the adhesive force in this range is secured, peeling or the like by volume changes during charging and discharging of battery cells in the battery module, changes in the use temperatures of the battery module or curing shrinkage, and the like is prevented, whereby excellent durability can be secured. Furthermore, it is possible to secure re-workability capable of enabling the module to be detached and reattached during the assembly process of the battery pack.

The cured product may secure durability in order to be applied to products requiring a long warranty period such as automobiles (in the case of automobiles, about 15 years or more). The durability may mean that after a thermal shock test in which one cycle is set to a process of maintaining the temperature at a low temperature of about −40° C. for 30 minutes and then raising the temperature to 80° C. and maintaining it for 30 minutes, and the cycle is repeated 100 times, separating or peeling, or cracks do not occur from the module case or battery cells of the battery module.

The cured product may have electrical insulation of about 3 kV/mm or more, about 5 kV/mm or more, about 7 kV/mm or more, 10 kV/mm or more, 15 kV/mm or more, or 20 kV/mm or more. As a dielectric breakdown voltage has a higher value, the cured product shows excellent insulation, where it may be about 50 kV/mm or less, 45 kV/mm or less, 40 kV/mm or less, 35 kV/mm or less, or 30 kV/mm or less, but is not particularly limited. In order to achieve such a dielectric breakdown voltage, an insulating filler may be applied to the curable composition. In general, among thermally conductive fillers, a ceramic filler is known as a component capable of securing insulation. The electrical insulation may be measured with a dielectric breakdown voltage measured according to ASTM D149 standard. In addition, if the cured product can secure the electrical insulation as above, stability can be secured while maintaining performance with respect to various materials, for example, a case or battery cell included in a battery module, and the like.

The cured product may have a specific gravity of 5 or less. In another example, the specific gravity may be 4.5 or less, 4 or less, 3.5 or less, or 3 or less. As the specific gravity of the cured product has a lower value, it is more advantageous for weight saving of the applied product, so that the lower limit thereof is not particularly limited. For example, the specific gravity may be about 1.5 or more, or 2 or more. In order for the cured product to exhibit such a specific gravity, for example, a method of applying a filler that the desired thermal conductivity can be secured even at a low specific gravity when the thermal conductive filler is added, that is, a filler having a low specific gravity by itself, or applying a surface-treated filler, or the like may be used.

It is appropriate that the cured product does not include a volatile material if possible. For example, in the cured product, the ratio of nonvolatile components may be 90 wt % or more, 95 wt % or more, or 98 wt % or more. Here, the ratio with the nonvolatile component can be defined in the following manner. That is, with regard to the nonvolatile content, a portion remaining after the cured product is maintained at 100° C. for about 1 hour can be defined as the nonvolatile content, and thus the ratio can be measured based on the ratio after maintaining it at 100° C. for 1 hour or so with the initial weight of the cured product.

The cured product may have an excellent resistance to deterioration, if necessary, where stability that does not react chemically, if possible, may be required.

It may be advantageous for the cured product to have a low shrinkage ratio during or after curing. Through this, it is possible to prevent occurrence of peeling or voids, and the like that may occur in the process of manufacturing or using various materials, for example, a case or battery cell included in a battery module, and the like. The shrinkage ratio may be appropriately adjusted within a range capable of exhibiting the above-described effects, which may be, for example, less than 5%, less than 3%, or less than about 1%. Since the shrinkage ratio is more advantageous as the numerical value is lower, the lower limit thereof is not particularly limited.

The cured product may also advantageously have a low coefficient of thermal expansion (CTE). Through this, it is possible to prevent occurrence of peeling or voids, and the like that may occur in the process of manufacturing or using various materials, for example, a case or battery cell included in a battery module, and the like. The coefficient of thermal expansion may be appropriately adjusted within a range capable of exhibiting the above-described effects, which may be, for example, less than 300 ppm/K, less than 250 ppm/K, less than 200 ppm/K, less than 150 ppm/K, or less than 100 ppm/K. Since the coefficient of thermal expansion is more advantageous as the numerical value is lower, the lower limit thereof is not particularly limited.

In the cured product, tensile strength may be appropriately adjusted, and through this, an excellent impact resistance and the like may be secured. The tensile strength may be adjusted, for example, in the range of about 1.0 MPa or more.

In the cured product, elongation may be appropriately adjusted, and through this, the excellent impact resistance may be secured. The elongation may be adjusted, for example, in the range of about 10% or more or about 15% or more.

It may be advantageous that the cured product also exhibits appropriate hardness. The term appropriate hardness may be hardness to which the cured product is not evaluated as being brittle. When the hardness of the cured product is excessively high, the cured product is excessively brittle, which may adversely affect reliability. In addition, through the adjustment of the hardness, the impact resistance and vibration resistance can be ensured, and the durability of the product can be ensured. In the cured product, the hardness may be measured using a hardness scale. In addition, for example, the cured product may have hardness of less than 80 or so in Shore 00 type. The hardness of the cured product usually depends on the type or ratio of the filler contained in the cured product, and when an excessive amount of the filler is included, the hardness usually increases.

In the cured product, a 5% weight loss temperature in thermogravimetric analyses (TGA) may also be 400° C. or higher, or the remaining amount at 800° C. may be 70 wt % or more. Due to these characteristics, stability at high temperature may be further improved with respect to various materials, for example, a case or battery cell included in a battery module, and the like. In another example, the remaining amount at 800° C. may be about 75 wt % or more, about 80 wt % or more, about 85 wt % or more, or about 90 wt % or more. In another example, the remaining amount at 800° C. may be about 99 wt % or less. The thermogravimetric analysis (TGA) may be measured within a range of 25° C. to 800° C. at a temperature increase rate of 20° C./min under a nitrogen (N2) atmosphere of 60 $cm^3$/min. The thermogravimetric analysis (TGA) results can also be achieved by adjusting the composition of the cured product. For example, the remaining amount at 800° C. depends on the type or ratio of the thermally conductive filler contained in the cured product, and when an excessive amount of the thermally conductive filler is included, the remaining amount increases. However, when the polymer and/or monomer used in the curable composition has generally high heat resistance compared to other polymers and/or monomers, the remaining amount more increases, and the polymer and/or monomer component included in the cured product also affects the hardness as such.

The curable composition of the present application may be formed by stirring and mixing a polyolefin binder having an acid anhydride unit, a filler and a dispersant. In addition, the curable composition may be formed by adding a polyolefin binder having an acid anhydride unit, a filler and a dispersant, adding a plasticizer and a flame retardant, and the like, and then stirring and mixing them.

The curable composition of the present application is not particularly limited with respect to the mixing order as long as all necessary components can be included.

The curable composition of the present application can be used in various electric and electronic products such as a clothes iron, a washing machine, a dryer, a clothes manager, an electric shaver, a microwave oven, an electric oven, an electric rice cooker, a refrigerator, a dishwasher, an air conditioner, a fan, a humidifier, an air purifier, a mobile phone, a radiotelegraph, a television, a radio, a computer and a laptop, or batteries such as a secondary battery, to radiate the generated heat. In particular, in a battery for an electric car manufactured by gathering battery cells to form one battery module and combining several battery modules to form one battery pack, the curable composition of the present application may be used as a material for connecting the battery modules. When the curable composition of the present application is used as a material for connecting the battery modules, it may serve to dissipate heat generated in the battery cell and fix the battery cells from external shock and vibration.

The present application may provide a device comprising an exothermic element and a cooling region, wherein a cured product of the curable composition of the present application between the exothermic element and the cooling region, which is in thermal contact with the both, is included.

The device may be various electric and electronic products such as a clothes iron, a washing machine, a dryer, a clothes manager, an electric shaver, a microwave oven, an electric oven, an electric rice cooker, a refrigerator, a dishwasher, an air conditioner, a fan, a humidifier, an air purifier, a mobile phone, a radiotelegraph, a television, a radio, a computer and a laptop, or batteries (battery cells and battery modules, etc.) such as a secondary battery.

The cured product of the curable composition of the present application may transfer heat generated from the exothermic element to the cooling region. That is, the cured product of the curable composition may radiate heat generated from the exothermic element.

The cured product of the curable composition may be positioned between the exothermic element and the cooling region to thermally contact them. The thermal contact means that the cured product of the curable composition is in physically direct contact with the exothermic element and the cooling region to radiate heat generated from the exothermic element to the cooling region, or even if the cured product of the curable composition is not in direct contact with the exothermic element and/or the cooling region (that is, there is a separate layer between the cured product of the curable composition and the exothermic element and/or the cooling region), it dissipates heat generated from the exothermic element to the cooling region.

Advantageous Effects

The present application can provide a curable composition having appropriate viscosities and thixotropy before and after curing even if an excessive amount of filler is included.

The present application can provide a curable composition without any sedimentation phenomenon of particles even in long-term storage.

DESCRIPTION OF DRAWINGS

The FIGURE is a graph showing the measured force over time of the curable compositions according to Examples 1 and 2 and Comparative Examples 1 to 4 of the present application.

BEST MODE

Hereinafter, the present application will be described through Examples and Comparative Examples, but the scope of the present application is not limited by the contents presented below.

<Method of Measuring Physical Properties>

(1) Evaluation Method of Long-Term Particle Sedimentation

A curable composition was placed in a glass vial and left at room temperature and atmospheric pressure for about 60 days. Thereafter, the curable composition in the glass vial was visually observed, and particle sedimentation was evaluated according to the following criteria.

PASS: In the vial, the curable composition maintains its liquid form without layer separation NG: In the vial, layer separation of the curable composition occurs or the curable composition hardens due to curing (2) Method of Measuring Pressing Force The formed curable composition was placed up to a height of 30 mm from the bottom of a glass vial (about 3 cm in diameter and about 10 cm in height) and left at room temperature for about 60 days.

For measurement of the pressing force, a tip detachable to a physical property analyzer (Texture Analyzer, TA) was manufactured. Specifically, the tip is one that a cylinder (part T1) having a diameter of 1 mm and a height of 1 cm and a cylinder (part T3) having a diameter of 3 mm and a height of 3 cm are bonded, which has a total height of 4 cm. The end of the T3 part was connected to a physical property analyzer. Thereafter, the glass vial containing the left curable composition was placed in the measurement space of the physical property analyzer, and the end of the T1 part was placed to face the curable composition contained in the glass vial at a distance of 5 mm, thereby completing the pressing force measurement setup.

Thereafter, the force applied to the tip was measured by pressing the curable composition contained in the glass vial while lowering the tip at a constant speed of 2 mm/s. At this time, the force applied to the tip and the pressing force were measured over time from when the end of the T1 part began to contact the curable composition until it reached a depth of 20 mm.

Example 1

A polybutadiene (A, manufacturer: Evonik, product name: polyvest MA75) containing a maleic anhydride unit, a thermally conductive filler (B) and a dispersant (C) were mixed in a weight ratio of 100:1,600:4.8 (A:B:C) to form a curable composition.

As the polybutadiene (A) containing the maleic anhydride unit, one having an acid value of 70 to 90 mg KOH/g (identified by DIN EN ISO 2114) or so, a weight average molecular weight ($M_w$) of about 10,200 g/mol or so, an average molecular weight ($M_n$) of about 3,060 g/mol or so and a polydispersity index ($PDI=M_w/M_n$) of about 3.32 or so was used.

In addition, as the thermally conductive filler (B), a mixture of spherical aluminum oxide (B1) having an average particle diameter of about 70 μm, spherical aluminum oxide (B2) having an average particle diameter of about 20 μm and non-spherical aluminum hydroxide (B3) having an average particle diameter of about 1 μm in a weight ratio of 65:20:15 (B1:B2:B3) was used.

The average particle diameter of the filler mentioned in this specification is a D50 particle diameter, also called a so-called median particle diameter, and is a particle diameter (median diameter) at 50% cumulative of the volume-based cumulative curve of the particle size distribution. Such a particle diameter can be defined as the particle diameter at the point where the particle size distribution is obtained on the basis of the volume and the cumulative value becomes 50% on the cumulative curve with 100% of the total volume. The D50 particle diameter can be measured using Marven's MASTERSIZER 3000 equipment based on ISO-13320, where ethanol has been used as a solvent.

As the dispersant (C), BYK's DISPERBYK-118 was used. The dispersant had a weight average molecular weight ($M_w$) of about 16,500 g/mol or so, and a polydispersity index ($PDI=M_w/M_n$) of about 1.23 or so. Also, in the dispersant, about 20 wt % based on the total weight is made of propyleneglycol monoethyl ether acetate (propyleneglycol monomethyl ether acetate), the remainder is made of a compound containing a unit of Formula 1 which is a copolymerization unit of polypropylene glycol (PPG), polyethylene glycol (PEG) and phosphoric acid (PA).

[Formula 1]

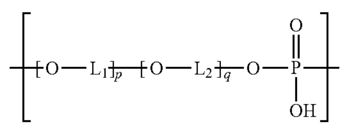

In Formula 1 above, p/q is about 1.

Example 2

A curable composition was formed in the same manner as in Example 1 above, except that the polybutadiene (A, manufacturer: Evonik, product name: polyvest MA75) containing a maleic anhydride unit, the thermally conductive filler (B) and the dispersant (C) were mixed in a weight ratio of 100:1,600:4.8 (A:B:C) and a thiol compound (D) was further mixed. As the thiol compound (D), 1-dodecanthiol was used, and the content of the added thiol compound (D) was 300 parts by weight relative to 100 parts by weight of the dispersant (C).

Comparative Example 1

The same polybutadiene (A, manufacturer: Evonik, product name: polyvest MA75) containing a maleic anhydride unit and thermally conductive filler (B) as those of Example 1 above were used, but were mixed in a weight ratio of 100:1,600 (A:B) without using the dispersant (C) to form a curable composition.

Comparative Example 2

A curable composition was formed in the same manner as in Example 1 above, except that BYK's DISPERBYK-111, a phosphoric acid-based dispersant, was used as the dispersant (C). The DISPERBYK-111 had a weight average molecular weight ($M_w$) of about 1,750 g/mol or so, and a polydispersity index ($PDI=M_w/M_n$) of about 1.7 or so.

Comparative Example 3

A curable composition was formed in the same manner as in Example 1, except that BYK's DISPERBYK-102, a phosphoric acid-based dispersant, was used as the dispersant (C). The DISPERBYK-102 had a lower polarity than DISPERBYK-111 used in Comparative Example 2, a weight average molecular weight ($M_w$) of about 1,630 g/mol or so, and a polydispersity index ($PDI=M_w/M_n$) of about 1.46 or so.

Comparative Example 4

A curable composition was formed in the same manner as in Example 1 above, except that the polybutadiene (A, manufacturer: Evonik, product name: polyvest MA75) containing a maleic anhydride unit, the thermally conductive filler (B) and a thiol compound (D) were mixed in a weight ratio of 100:1,600:4.8 (A:B:D). As the thiol compound (D), 1-dodecanthiol was used.

The physical property measurement results of Examples and Comparative Examples above were shown in the following table.

TABLE 1

| Classification | Long-term sedimentation evaluation | Pressing force (gf) |
|---|---|---|
| Example 1 | X | 46.8 |
| Example 2 | X | 27.7 |
| Comparative Example 1 | ○ | 67.0 |
| Comparative Example 2 | ○ | 219.7 |
| Comparative Example 3 | ○ | 184.8 |
| Comparative Example 4 | ○ | 65.9 |

As shown in Table 1, it can be seen that in the evaluation of long-term particle sedimentation, the curable compositions according to Examples 1 and 2 have not settled even after being left for a long time, and it can be seen therefrom that the storage stability for a long time is excellent.

On the other hand, in the evaluation of long-term particle sedimentation, the curable compositions according to Comparative Examples 1 to 4 caused layer separation by settling the particles down in the vial.

Here, as shown in Table 1, the pressing force of the curable composition according to Example 1 was 46.8 gf and the pressing force of the curable composition according to Example 2 was 27.7 gf, and it can be seen that both have not caused particle sedimentation even when left for a long time.

On the other hand, the pressing force of the curable compositions according to Comparative Examples 1 to 4 were 67.0 gf, 219.7 gf, 184.8 gf, and 65.9 gf, respectively, and it can be seen that all have caused particle sedimentation when left for a long time.

The FIG. 1*s* a graph showing the measured force over time of the curable compositions according to Examples 1 and 2 and Comparative Examples 1 to 4 of the present application. In the FIGURE, the portion where the pressing force rapidly increases over time means the time when the T3 part of the tip is in contact with the curable composition.

As shown in the FIGURE, it can be seen that the maximum forces for the curable compositions according to Examples 1 and 2 and Comparative Examples 1 to 4 are as shown in Table 1 above.

Here, the constitutions and features of the present application have been described based on Examples according to the present application, but the present application is not limited thereto, and it is apparent to those skilled in the technical field to which the present application belongs that various changes or modifications can be made within the ideas and scope of the present application, and thus it is pointed out that such changes or modifications fall within the scope of the appended claims.

The invention claimed is:

1. A curable composition comprising a polyolefin binder having an acid anhydride unit; a filler; and a dispersant;

wherein the dispersant comprises a polymer compound containing a unit of Formula 1 below:

[Formula 1]

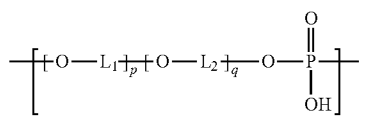

wherein, $L_1$ is an alkylene group having 3 to 6 carbon atoms, $L_2$ is a methylene group or an ethylene group, and p/q is a number within a range of 0.5 to 2.

2. The curable composition according to claim 1, wherein the acid anhydride unit is a maleic anhydride unit or a phthalic anhydride unit.

3. The curable composition according to claim 1, wherein the polyolefin binder has an acid value in a range of 50 to 120 mg KOH/g.

4. The curable composition according to claim 1, wherein the polyolefin binder contains one or more units selected from a styrenic unit, a butadiene unit or an isoprene unit.

5. The curable composition according to claim 1, wherein the polyolefin binder has a weight average molecular weight in a range of 3,000 to 30,000 g/mol.

6. The curable composition according to claim 1, wherein the polyolefin binder has a polydispersity index in a range of 2 to 5.

7. The curable composition according to claim 1, wherein the polymer compound containing a unit of Formula 1 has a weight average molecular weight in a range of 5,000 to 40,000 g/mol.

8. The curable composition according to claim 1, wherein the polymer compound containing a unit of Formula 1 has a polydispersity index in a range of 0.8 to 2.

9. The curable composition according to claim 1, wherein the dispersant is included in an amount of 1 to 10 parts by weight relative to 100 parts by weight of the polyolefin binder.

10. The curable composition according to claim 1, wherein the dispersant further comprises an ester compound.

11. The curable composition according to claim 10, wherein the ester compound is one or more selected from the group consisting of alkylene glycol monoalkyl ether acetates, alkylalkoxy propionates, alkylene glycol monoalkyl ether propionates, alkylene glycol diacetates, alkyl lactates and alkyl 2-hydroxyisoalkylates.

12. The curable composition according to claim 10, wherein the ester compound is included in an amount of 5 to 40 wt % relative to the total weight of the dispersant.

13. The curable composition according to claim 1, further comprising a thiol compound.

14. The curable composition according to claim 13, wherein the thiol compound is a thiol substituted with an alkyl group having 1 to 20 carbon atoms.

15. The curable composition according to claim 13, wherein the thiol compound is included in an amount within a range of 100 to 500 parts by weight relative to 100 parts by weight of the dispersant.

16. The curable composition according to claim 1, wherein the filler is included in an amount of 25,000 to 45,000 parts by weight relative to 100 parts by weight of the dispersant.

17. The curable composition according to claim 1, which has a pressing force of 60 gf or less.

18. A device comprising an exothermic element; and a cooling region, wherein a cured product of the curable composition of claim 1 is included between the exothermic element and the cooling region, and is in thermal contact with both the exothermic element and the cooling region.

* * * * *